United States Patent [19]

Hojo

[11] Patent Number: 5,198,049

[45] Date of Patent: Mar. 30, 1993

[54] STUD UNIT AND SKID-PROOF TIRE HAVING THE SAME

[76] Inventor: Hiroo Hojo, 16-14, Miwa 8-chome, Nagano-shi, Nagano-ken, Japan

[21] Appl. No.: 533,267

[22] Filed: Jun. 4, 1990

[30] Foreign Application Priority Data

Jun. 10, 1989 [JP] Japan ................................ 1-147184

[51] Int. Cl.$^5$ ............................................. B60C 11/16
[52] U.S. Cl. .................................... 152/210; 152/169
[58] Field of Search ........................ 152/210, 211, 169

[56] References Cited

U.S. PATENT DOCUMENTS 3,786,849  1/1974  Loquist ............................... 152/210
4,391,314  7/1983  Inamoto et al. .................... 152/210

FOREIGN PATENT DOCUMENTS 2204074  8/1973  Fed. Rep. of Germany ...... 152/210
 186704 10/1984  Japan ................................. 152/210

Primary Examiner—Michael W. Ball
Assistant Examiner—Francis J. Lorin
Attorney, Agent, or Firm—Jordan and Hamburg

[57] ABSTRACT

Cylinders each having open end and an internal engagement section in the mid-portion thereof are fixed in holes bored on an outer circumferential face of a tire tread. In each cylinder, a stud passing through a through-hole of the engagement section and having an expanded section at the front end thereof is inserted with play. The stud is biased toward the front end of the cylinder by a spring provided between a lid closing the rear opening of the cylinder and the expanded section. When the tire slips on a snow- or ice-covered road, the stud inclines and a large-neck section of the front end of the stud engages the rim of the cylinder to maintain the stud in a projected state. The projected large-neck section bites the surface of the road to prevent slippage. On a dry road, the stud 32 is pushed into the cylinder by the weight of the vehicle against the elasticity of the spring.

2 Claims, 6 Drawing Sheets

STUD UNIT AND SKID-PROOF TIRE HAVING THE SAME

BACKGROUND OF THE INVENTION

The present invention relates to stud unit and skid-proof tire having the stud unit for preventing vehicles from slipping on snow- or ice-covered roads.

Conventionally, snow tires having multiple studs on the outer circumferential face are used as skid-proof tires.

However, studs of the snow tires grind surfaces of roads when vehicles using the snow tires run on a road whose surface is dry and exposed. Powdered dust, which is worn from roads by grinding with studs of the snow tires, is blown up in the atmosphere and causes air pollution. The powdered dust is harmful for our health because it includes such harmful heavy metals as cadmium, lead, and the like. Further, traffic signs painted on roads are worn off by studs of the snow tires, which will be a factor in traffic accidents and a heavy expenditure for repairing the signs will be required. Then, to avoid the above noted disadvantages, melting snow and ice on roads by spraying calcium chloride and the like is attempted but roadside trees are blighted and secondary pollution, such as water pollution, occurs.

To avoid all these disadvantages, a skid-proof tire having stud units was disclosed in the Japanese Patent Provisional Publication (Kokai) Gazette No. 59-186704. Each stud unit shown in FIG. 13 has a cylinder 2 and a rubber elastic member 3 therein. A stud 5 is passed through a hole 3a, which is bored in the center of the rubber elastic member 3. The rear end of the stud 5 is engaged with an inside face of rear wall 2a of the cylinder 2. There is formed a large-neck section 6 at the front end of the stud 5, and the large-neck section 6 projects forward from the front opening of the cylinder 2.

Therefore, a surface of a road is not damaged while a vehicle using the tires runs at fixed speed because the stud 5 is pushed in the cylinder 2 against the elasticity of the elastic member 3.

When the vehicle is braked, accelerates, or reduces speed, a force, which is caused by the friction between the tire and the surface of the road, acts on the stud 5 contacting the surface of the road in the horizontal direction corresponding to the rotation of the tire, so that the stud 5 is inclined in the cylinder 2 and the jaw section of the large-neck section 6 engages the rim of the opening of the cylinder 2 to keep the stud projected. Thus, slippage can be prevented.

However, the above noted tire has following disadvantages:

(1) It is necessary to design the diameter of the shaft of the stud 5 large because a heavy force in the inclining direction acts on the stud 5 when the vehicle accelerates or is braked. But, if the shaft of the stud 5 is bigger, the elastic member 3 and the cylinder 2 must be bigger, so that each of the stud units must be heavier.

(2) When the stud 5 is inclined, the elastic member 3 is sometimes clipped as in a jaw between the underside of the large-neck section 6 and the rim of the opening of the cylinder 2.

(3) Because the durability and stability of the elastic member are low, the elastic member is apt to be permanently deformed by frequent inclination of the stud 5, so that the stud 5 sometimes will not return to the center.

(4) To engage the rear end of the stud 5 with the outside face of the rear wall 2a of the cylinder 2, it is necessary to squash the rear end of the stud 5 and to fix the rear wall 2a of the cylinder 2 by welding or the like, so that the assembling steps are increased and troublesome.

SUMMARY OF THE INVENTION

An object of the present invention is to provide a stud unit whose stud is certainly projected from and pushed into a cylinder the axis of which coincides with the axis of the stud, and a skid-proof tire having the stud units.

To achieve the above noted object, the present invention has following structure.

A stud unit for a skid-proof tire according to the invention may comprise:

a cylinder, whose front end is open, having a flange section at the rear end thereof for fixing the cylinder in a hole bored in a tire tread, the cylinder having an engagement section in the form of an annular projection from the inner wall at the border between large- and small-diameter sections of the cylinder and which projection has a through-hole bored therethrough in the axial direction of the cylinder;

a stud inserted into and being inclinable with respect to the cylinder, the stud having a shaft passed through the through-hole of the engagement section of the cylinder with play, an expanded section for engaging with the engagement section of the cylinder so as to prevent the stud from slipping out the front end of the cylinder, and a large-neck section, whose diameter is smaller than the diameter of the front end side of the cylinder, formed at the front end of the shaft and capable of projecting from the rim of the front opening of the cylinder, a jaw section of the stud engaging with the rim of the front opening of the cylinder when the stud is inclined with respect to the cylinder; and a spring compressed between a lid closing the rear opening of the cylinder and the expanded section of the stud, the spring biasing the stud in the axial direction of the cylinder toward the front opening of the cylinder and pushing the expanded section of the stud to contact the engagement section of the cylinder.

A chip made of cemented carbide may be fixed at the front end of the large-neck section, and the head of the chip is exposed.

The inner rim of the front opening of the cylinder may be chamfered as a curved face, and the underside of the large-neck section of the stud may be formed as a curved face corresponding to the curved face of the rim of the front opening of the cylinder.

The outer diameter of the large-neck section of the stud may be smaller than the inner diameter of the through-hole of the engagement section of the cylinder.

The expanded section of the stud may be formed like a plate, and a side wall of a maximum-diameter section of the plate-like expanded section may slidably contact the inner face of the cylinder.

Faces of the expanded section and the engagement section, which contact each other, may be perpendicular to the axes of the cylinder and the stud.

The diameter of the rear end of the shaft may be slightly smaller than the inner diameter of the through-hole of the engagement section of the cylinder, and the diameter of the shaft may be gradually reduced toward the jaw section.

A concave section may be formed on the upper face of the plate-like expanded section, and the lower end of the spring may be fitted in the concave section.

A shallow cap contacting the upper face of the expanded section may be provided, and the lower end of the spring may be fitted in the cap.

The skid-proof tire of the present invention has multiple stud units described above, and the stud units are fixed in holes bored on the outer circumferential face of the tire.

When a vehicle using the skid-proof tires of the present invention is braked on a dry road, the tread of each tire grips the surface of the road and no substantial horizontal force acts on the studs contacting the road, so that the studs are pushed into the cylinders and the road is not damaged.

While on a snow- or ice-covered road, the tread slips and horizontal force acts on the large-neck section of the front end of each stud, so that the jaw section of the stud engages the rim of the opening of the cylinder so as to keep the large-neck section projecting, and the studs bite the surface of the road to prevent slippage of the vehicle.

The expanded section of the rear end of each stud is biased by the spring rather than a rubber member surrounding the stud, so that the shaft connecting the large-neck section and the expanded section can be thicker and more durable.

BRIEF DESCRIPTION OF THE DRAWINGS

Embodiments of the present invention will now be described by way of examples and with reference to the accompanying drawings, in which.

DETAILED DESCRIPTION OF PREFERRED EMBODIMENTS

Preferred embodiments of the present invention will now be described with reference to the accompanying drawings.

Figure 1:
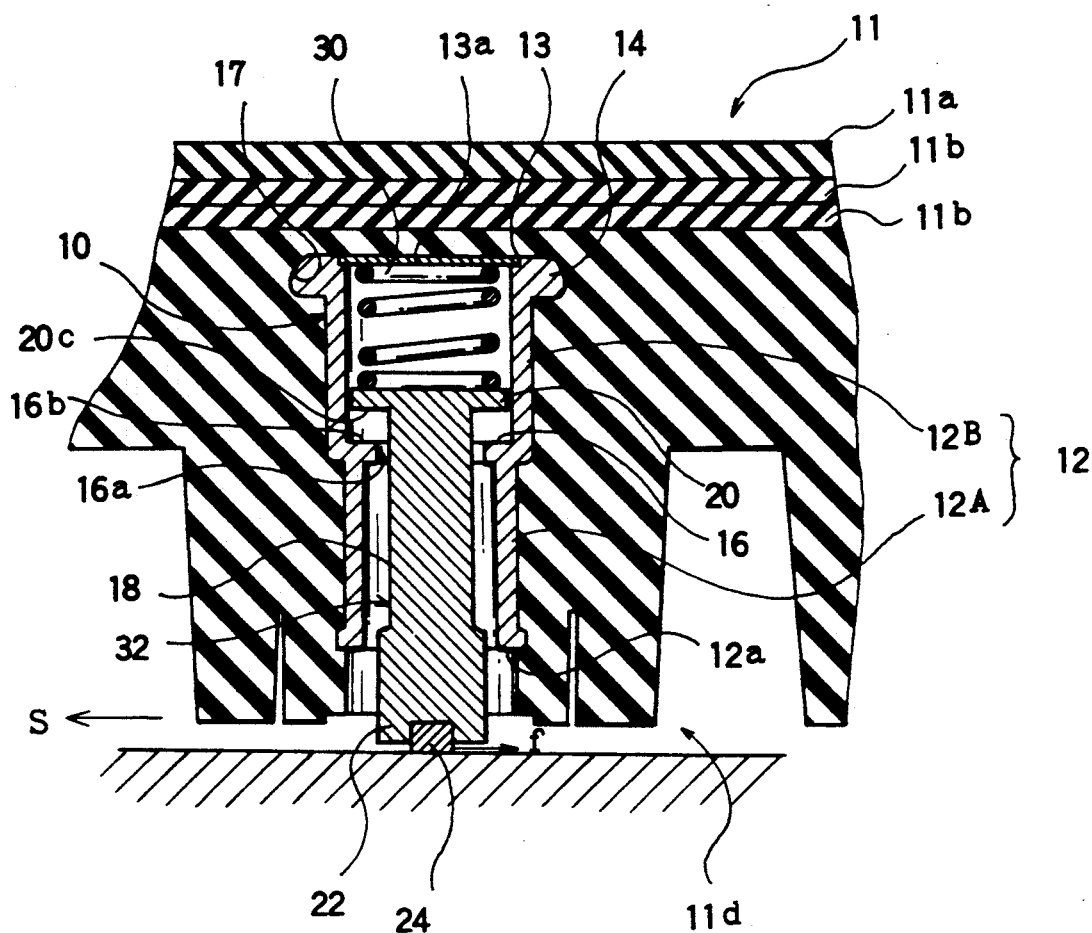
FIG. 1 is a sectional view of a part of a skid-proof tire of the present invention.
Figure 2:
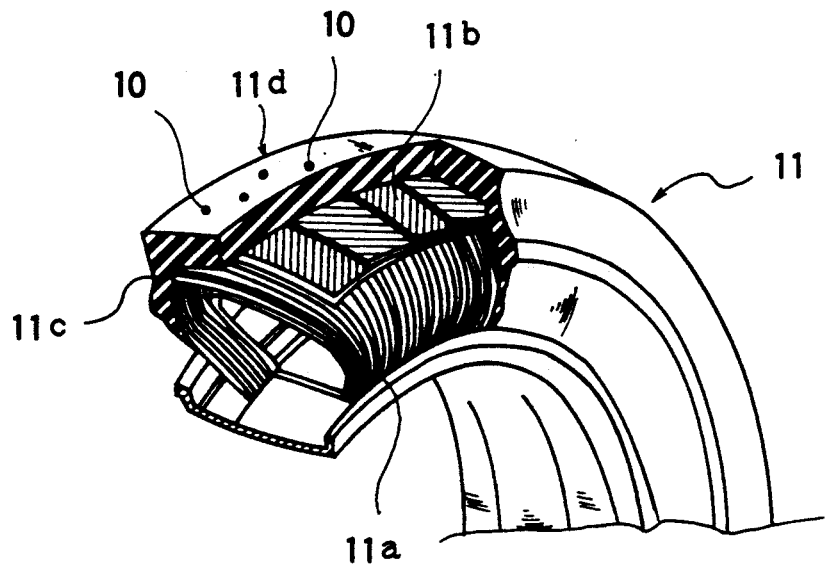
FIG. 2 is a partially cutaway view in perspective of the tire.

A tire 11 is composed of, as shown in FIGS. 1 and 2, a carcass 11a, breakers 11b superimposed as several layers on the outer face of the carcass 11a and a rubber layer 11c superimposed on the outer face of the breakers 11b. The rubber layer 11c is formed thick so as to support the weight of a vehicle and to bear shock and friction. There is formed a tread 11d on the outer circumferential face of the rubber layer 11c.

Figure 3:
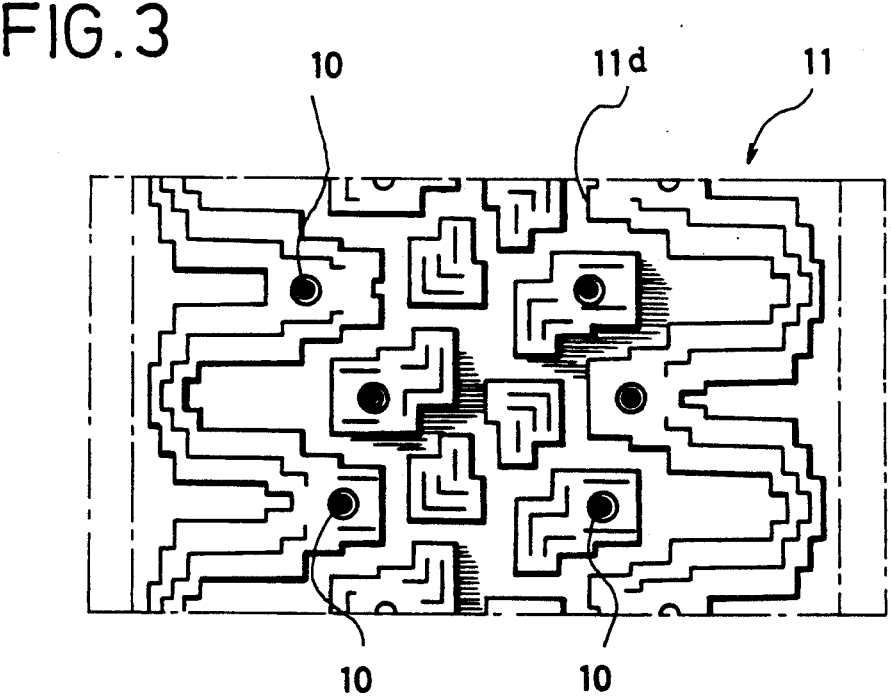
FIG. 3 is a partial plan view of the tire in which stud units are fixed in a tread.

There are bored multiple holes 17 (see FIG. 1) in all treads 11d, and stud units 10 are respectively fixed into the holes 17 (see FIG. 3).

Figure 4:
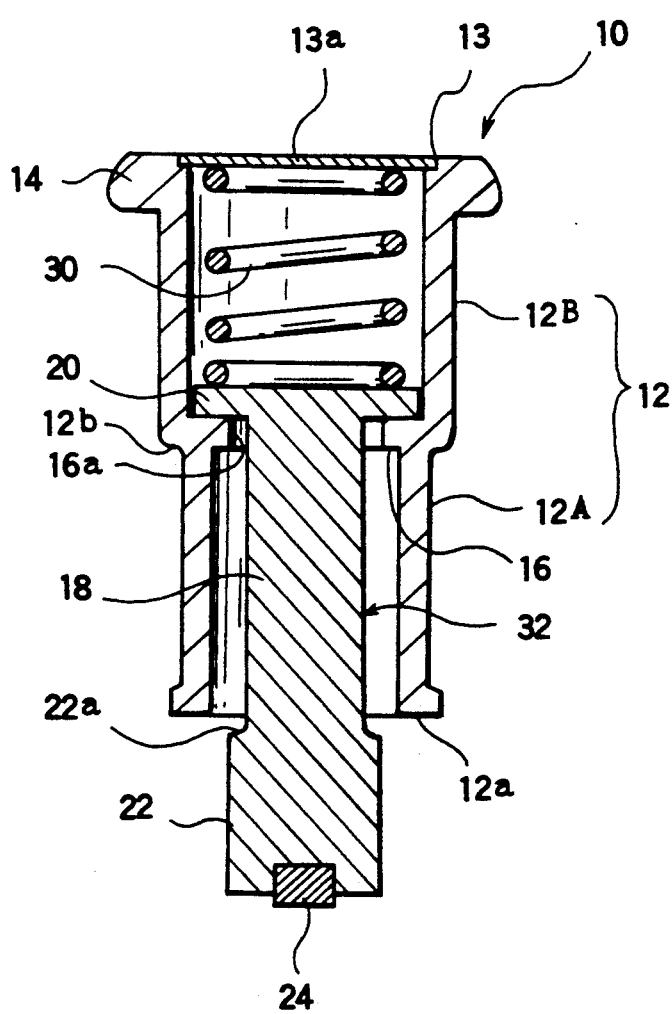
FIG. 4 is a longitudinal sectional view of the stud unit.

The stud unit will be explained with reference to FIG. 4.

There is formed a flange 14 at a rear end of a cylinder 12 of the stud unit 10. The front end of the cylinder 12 is a small-diameter section 12A; the rear end thereof is a large-diameter section 12B.

There is formed a step 12b at the border between the small-diameter section 12A and the large-diameter section 12B. An engagement section is defined by an inwardly projecting annular flange having a through-hole 16a.

A stud 32 is inserted in the cylinder 12 with play. The rear end of the stud 32 is formed as an expanded section 20 and placed in the large-diameter section 12B of the cylinder 12. The mid-portion of the stud 32 is a shaft 18 and passes through the through-hole 16a with play. The front end of the shaft 18 is a large-neck section 22 with larger diameter. A chip 24 made of cemented carbide is fixed at the center of the bottom face of the large-neck section 22, and its head section is exposed.

The rear end of the large-diameter section 12B of the cylinder 12 is opened as an opening 13. The opening 13 is closed by a lid 13a. A spring 30 is elastically attached between the lid 13a and the expanded section 20 of the stud 32, so that the stud 32 is biased toward the front opening of the cylinder 12. The spring 30 presses the expanded section 20 of the stud 32 to the engagement section 16, so that the axes of the stud 32 and the cylinder 12 always coincide with each other. Then, the large-neck section 22 of the stud 32 is projected outward from the rim 12a of the cylinder 12. Namely, the shaft 18 is longer than the distance between the upper face of the engagement section 16 and the front end of the small-diameter section 12A.

The bottom face 20c of the expanded section 20 and the upper face 16b of the engagement section 16 are planes perpendicular to the axes of the stud 32 and the cylinder 12. With this structure, the axes of the stud 32 and the cylinder 12 are coincident with each other when the expanded section 20 of the stud 32 is pressed to the engagement section 16 of the cylinder 12 by the spring 30.

A jaw section 22a of the large-neck section 22 is in the form of a concave curve; the inner part of the rim 12a of the cylinder 12 is formed as a curved face corresponding to the concave curve of the jaw section 22a.

The diameter of the expanded section 20 is slightly smaller than the inner diameter of the large-diameter section 12B and is larger than the diameter of the through-hole 16a.

The diameter of the large-neck section 22 of the stud 32 is slightly smaller than the diameter of the through-hole 16a and is also smaller than the inner diameter of the small-diameter section 12A of the cylinder 12.

Therefore, the movement of the stud 32 toward the front end of the cylinder 12 is limited by the expanded section 20 and the engagement section 16; the stud 32 can be removed and inserted from the rear end of the cylinder 12.

The stud 32 can be inclined in the cylinder 12. The jaw section 22a of the large-neck section 22 then engages with the rim 12a of the cylinder 12 whereby the large-neck section 22 cannot be pushed into the small-diameter section 12A when the stud 32 is inclined, so that the state that the stud 32 is projected from the cylinder 12 is maintained.

To assemble the stud unit 10, first the stud 32 and then the spring 30 are put into the cylinder 12 through the opening 13, the lid 13a is set to close the opening 13 and then the lid 13a is fixed at the rear end of the cylinder 12 by welding or the like.

The stud unit 10 is fixed in the hole 17 of the tire 11 with the entire cylinder 12 embedded in the hole 17. The front end of the large-neck section 22 always projects from the tread 11d of the tire 11 because the spring 30 always biases the stud 32 outward. The stud unit 10 is fixed in the hole 17 by the flange section 14 and the step 12b on the outer face of the cylinder 12. The stud unit 10 can be set into the hole 17 by a conventional stud-driving device (not shown). If the rim 12a of the cylinder 12 is formed thick, the rim 12a can be pushed, so that it will be easier to set the stud unit 10. Once set in place, the cylinder 12 is prevented from inclining in and getting out from the hole 17.

Successively, the function of the tire 11 having the stud units 10 will be explained.

First, the case of fixed speed will be explained with reference to FIGS. 1 and 5.

Rotating the tire 11, the front end of the studs 32 contact a surface of a road together with the tread 11d.

Figure 5:
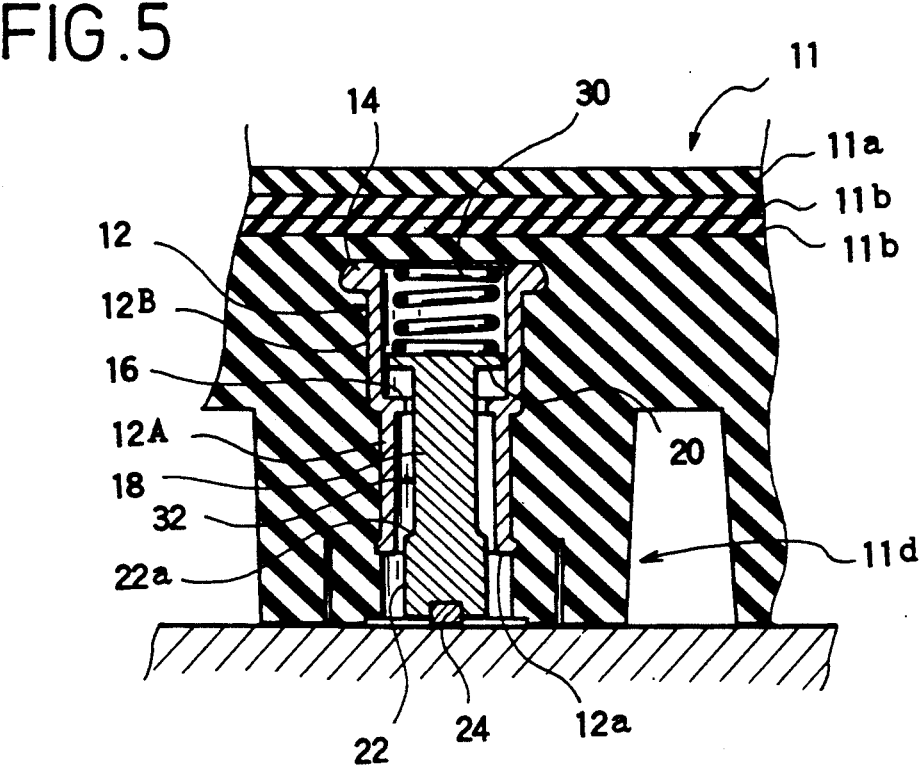
FIG. 5 is a partial sectional view of the tire whose stud unit contacts a road.
Figure 6:
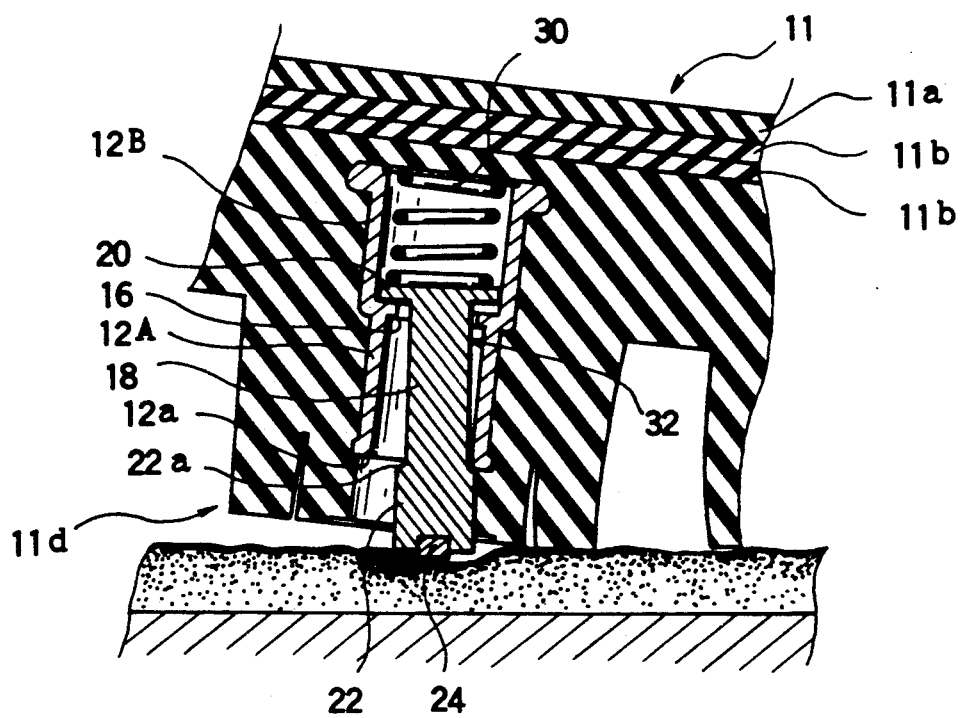
FIG. 6 is a partial sectional view of the tire which is being braked on a snow- or ice-covered road.

The weight of the vehicle pushes the stud 32 contacting the road, so that the stud 32 is pushed into the cylinder 12 against the elasticity of the spring 30 (see FIG. 5). At that time the stud 32 is pushed back by the elasticity of the spring 30 but the elasticity is so small that the stud 32 does not damage the road.

If the stud 32 leaves the road with the rotation of the tire 11, the front end of the stud 32 is projected from the tread 11d by the spring 30.

Next, functioning in the case of applying the brakes will be explained.

On a dry road, the friction is large so the tread 11d holds the surface of the road. When the brake is applied, friction is generated between the tread 11d and the surface of the road, so that almost no horizontal force acts on the stud 32. Therefore, the stud 32 is pushed into the cylinder 12 and the road is not damaged thereby.

Note that if a very small horizontal force acts on the stud 32 to cause it to incline and the jaw section 22a of the large-neck section 22 tends to engage with the rim 12a of the cylinder 12, the stud 32 is nevertheless pushed into the cylinder 12 by the weight of the vehicle because a large friction is generated between the tread 11d and the surface of the road so that the horizontal force acting on the stud 32 is very small and the jaw section 22a and the rim 12a have curved faces.

But, on a snow- or ice-covered road, the tire is apt to slip. If the brake is applied on such slippery road, the part of the tread 11d which contacts the road slips in the S direction (see FIG. 1). But the stud 32 bites the road, so that immediately a large horizontal force "f" from the road acts on the stud 32. With this force "f", the stud 32 is quickly inclined in the direction of the movement of the vehicle and the jaw section 22a of the large-neck section 22 engages with the rim 12a of the cylinder 12, so that the stud 32, which cannot be pushed into the cylinder 12 because of the engagement, bites the surface of the snow- or ice-covered road and the vehicle can get enough braking action.

The functioning in case of applying the brakes has been described, and the functioning in case of acceleration or starting on a slope is similar to the above.

Namely, on dry roads, the tread 11d holds the surface of the road, so that almost no horizontal force acts on the stud 32, and the stud 32 is pushed into the cylinder 12. The surface of the road is also not damaged by the stud 32.

In case of acceleration or starting on a snow- or ice-covered road, the tire 11 is apt to slip. When the tread 11d slips, immediately a large horizontal force from the surface acts on the stud 32, so that the stud 32 is inclined in the direction of the movement of the vehicle and the jaw section 22a of the cylinder 12 engages the rim 12a of the cylinder 12. The large-neck section 22 cannot be pushed into the cylinder because of the engagement, and slippage of the tire 11 is thus prevented.

In the present invention, no elastic member is provided between the shaft 18 of the stud 32 and the inner face of the cylinder 12, and the spring 30 is provided in the large-diameter section 12B of the cylinder 12, so that the diameter of the cylinder 12 need not be so large and the stud unit 10 can be smaller. The shaft 18 can be thicker and more durable without enlarging the diameter of the cylinder 12.

Note that the corner section from the jaw section 22a of the stud 32 to the large-neck section 22 may be curved. In this case, retraction of the stud 32 into the cylinder 12 despite a small horizontal force is facilitated. And if sand and the like is introduced into the gap between the cylinder 12 of the stud unit 10 and the stud 32, it is forced out therefrom because of the reciprocative movement of the stud 32 and the centrifugal force of the rotating tire 11.

Other embodiments of the stud unit are shown in FIGS. 7–8 and 10–12.

Figure 7:
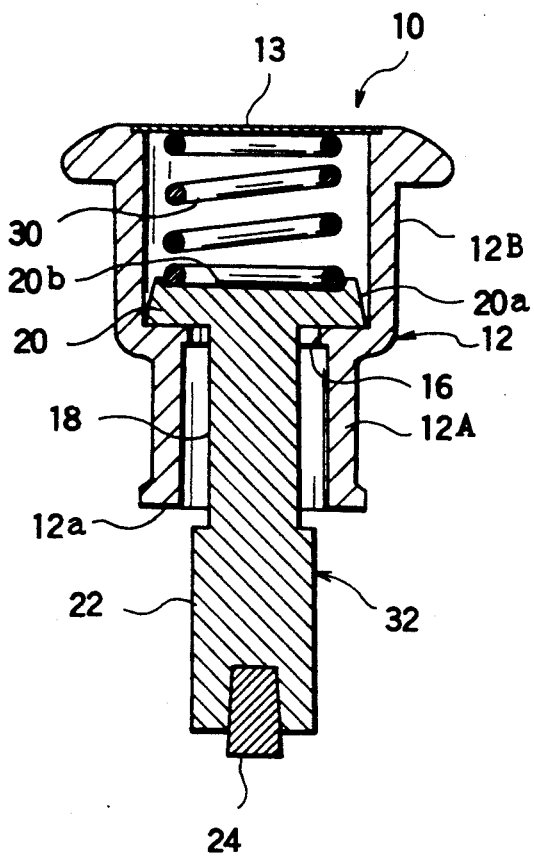
FIGS. 7 and 8 are sectional views of stud units of other embodiments.

In FIG. 7, the expanded section 20 of the stud 32 is relatively thicker and approximately trapezoidal in longitudinal section. The diameter of the lower end part or the largest-diameter part of the expanded section 20 is almost the same as the inner diameter of the large-diameter section 12B of the cylinder 12. There is formed a concave section 20b on the upper face of the expanded section 20, and the lower end of the spring 30 is fitted in the concave section 20b.

Figure 8:
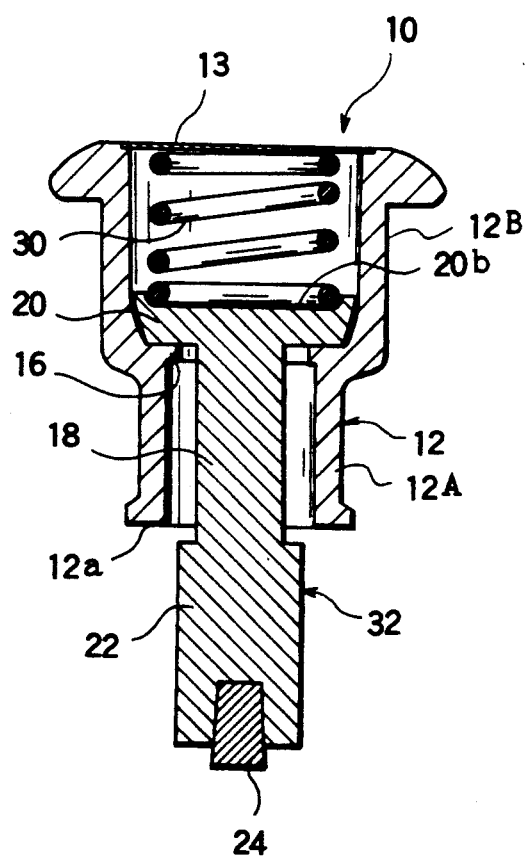

In FIG. 8, the expanded section 20 of the stud 32 is approximately an inverted trapezoid in section, and its largest-diameter part is at its upper end. Other structures are the same as those shown in FIG. 7.

Figure 10:
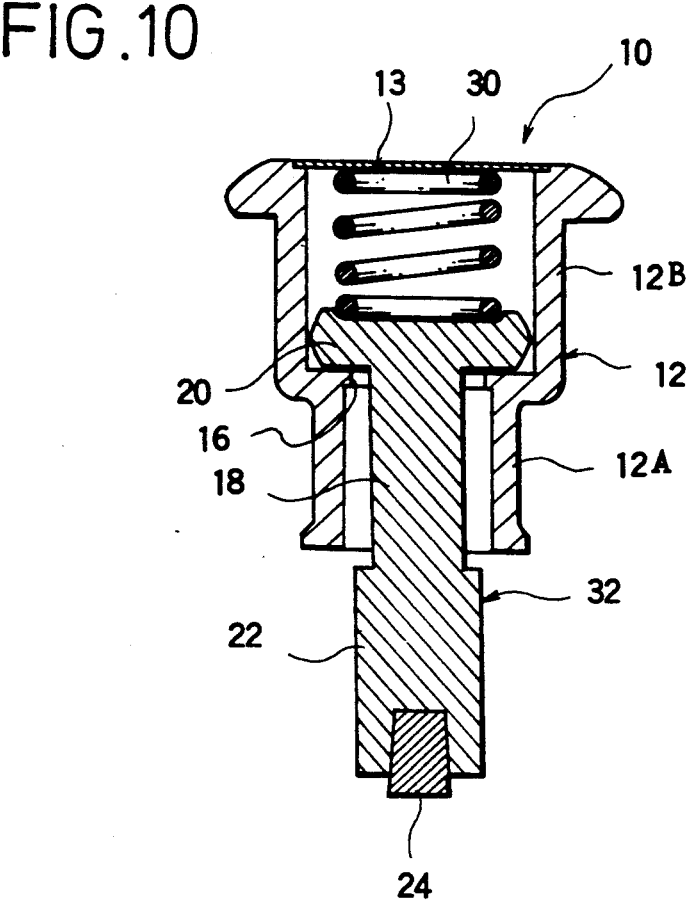
FIGS. 10–12 are sectional views of stud units of other embodiments.

In FIG. 10, the side wall face of the expanded section 20 is arch-shaped in section, and its midway part is the largest-diameter part.

Figure 11:
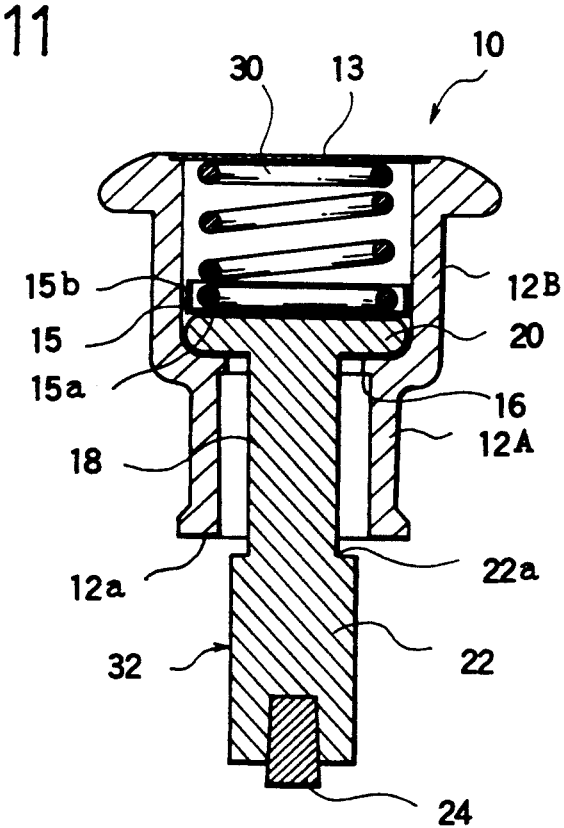

In FIG. 11, a cap 15 is provided on the expanded section 20, and the lower end section of the spring 30 is fitted in the cap 15. The cap 15 is composed of a circular flat plate section 15a and a standing section 15b.

Figure 12:
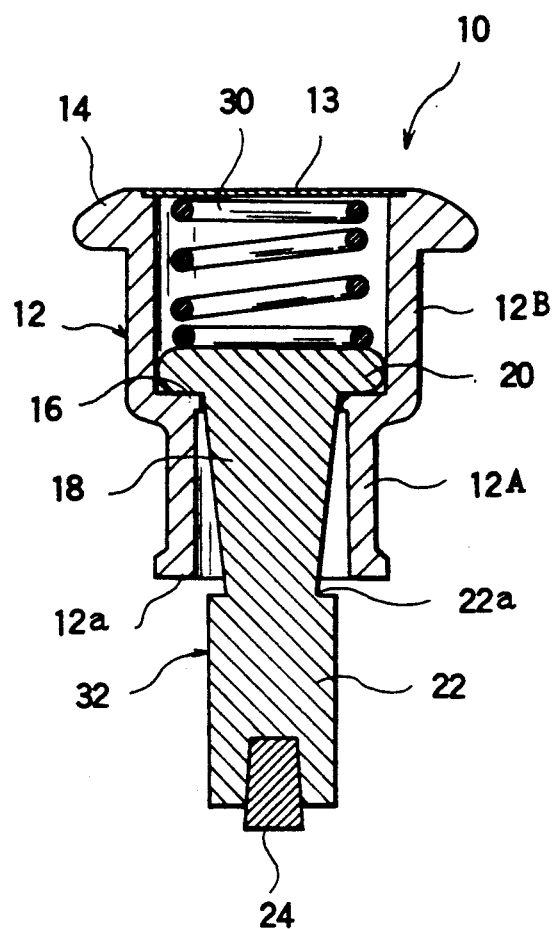
Figure 13:
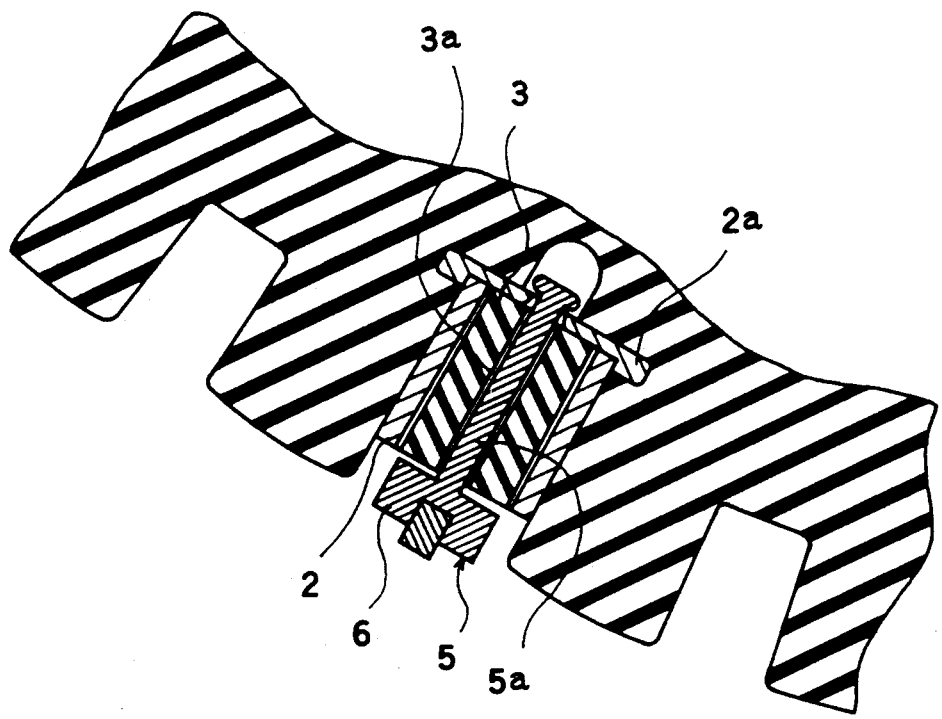
FIG. 13 is a sectional view of a skid-proof tire having conventional stud units.

In FIG. 12, the diameter of the shaft 18 is gradually reduced from the expanded section 20 to the jaw section 22a of the large-neck section 22. Note that the diameter of the base of the shaft 18 connected to the expanded section 20 is slightly smaller than the diameter of the through-hole of the engagement section 16, and the axes of the stud 32 and the cylinder 12 coincide with each other while the stud 32 is projected. This shaft 18 can be more durable.

Figure 9:
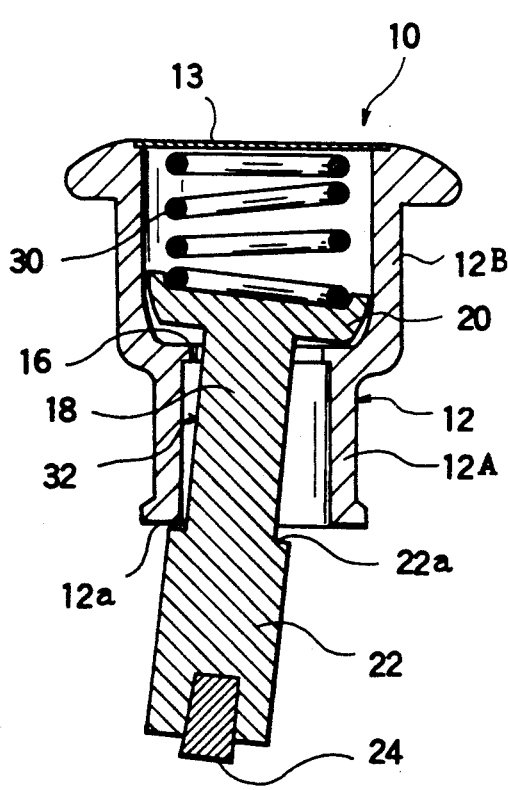
FIG. 9 is a sectional view of the stud unit of FIG. 8, whose stud is inclined.

In the embodiments of FIGS. 7–8 and 10–12, each largest-diameter part of the expanded section 20 is almost the same as the inner diameter of the large-diameter section 12B of each cylinder 12. Therefore, the expanded section 20 is guided in the large-diameter section 12B during the fixed speed operation of the vehicle, so the stud 32 can be projected from and pushed into the cylinder 12 without horizontal movement. If a horizontal force acts on the stud 32, for example, upon braking, the stud 32 smoothly swings to incline about the largest-diameter part as a rotational axis (see FIG. 9).

The lower end of the spring 30 is fitted in the concave section 20a of the expanded section 20 or the plate-like cap 15, so that the spring 30 does not leave the upper face of the expanded section 20 even when the stud 32 inclines. And the spring 30 readily biases the stud 32 to project and pushes the expanded section 20 to contact the engagement section 16 while maintaining the axes of the stud 32 and the cylinder 12 coincident with each other.

Only the inner diameters of the large- and the small-diameter sections 12B and 12A of the cylinder 12 need be different from each other, and their outer diameters may be the same.

Further, a projection may be formed in the stud 32 instead of the chip 24. The stud and the cylinder may be made of ceramics or hard plastics or the like.

What is claimed is:

1. A cylindrical stud unit adapted to be fixed in a cylindrical hole in a tread of a tire with the hole and the stud unit radially oriented with respect to the tire, comprising a stud having a radially inner and a radially outer end with respect to the tire a hollow cylinder having a closed end and an open end, the cylinder including a rim defining the periphery of the opening of the open end, the cylinder including means for fixing it in the hole in the treads axially with respect to the cylinder with the closed end being the radially inner end with respect to the tire, and a spring positioned with one extremity thereof engaging the closed end of the cylinder and an opposite extremity thereof engaging the inner end of the stud to bias the stud outwardly, the cylinder and the stud each being provided with engagement means defining surfaces which mutually engage to prevent further outward projection of the stud when the stud has been projected by the force of the spring so that the outer end of the stud projects outwardly beyond the tread, the engagement means of the stud comprising a portion of the stud at the inner end of the stud and having a larger diameter than a shaft portion of the stud, located between the inner and outer ends of the stud the engagement means of the cylinder comprising an annular flange formed on an inner wall of the cylinder, extending radially inwardly with respect to the cylinder and having a hole formed axially therethrough, the axial hole being of smaller diameter than the enlarged inner end portion of the stud and having a larger diameter than the shaft portion of the stud, the enlarged inner end portion of the stud being received in the cylinder with only a slight radial clearance, the shaft portion of the stud extending to the opening of the cylinder and a portion of the stud at the outer end thereof being radially enlarged and defining at its juncture with the shaft; an annular surface extending radially with respect to the stud, the shaft being received in the cylinder with play sufficient to permit the stud to incline discernibly when a horizontal force is applied to the outer end of the stud, when said horizontal force is substantial due to the stud being in contact with a road surface upon which the tread is sliding, the consequent inclination of the stud holding said annular surface of the stud against the rim of the opening with sufficient force that the weight of a vehicle does not cause the stud to retract but inclination of the stud by a lesser horizontal force permitting the stud to retract under the weight of a vehicle due to the tendency of the stud to assume an orientation such that it is coaxial with the cylinder.

2. A cylindrical stud unit according to claim 1, in which the annular surface of the stud and the rim of the cylinder are of curvilinear axial cross section thereby to facilitate mutual disengagement of the annular surface and the rim when the horizontal force acting on the end of the stud is not substantial and thereby facilitate retraction of the stud under the weight of the vehicle.

* * * * *